(12) United States Patent
Harada

(10) Patent No.: US 10,752,152 B2
(45) Date of Patent: Aug. 25, 2020

(54) TRAILER HOUSE

(71) Applicant: CUMBERLAND JAPAN CO., LTD., Nagano-shi, Nagano (JP)

(72) Inventor: Hideyo Harada, Nagano (JP)

(73) Assignee: CUMBERLAND JAPAN CO., LTD, Nagano-shi ( * ) Notice: Subject to any disclaimer, the term of this patent is extended or adjusted under 35 U.S.C. 154(b) by 119 days.

(21) Appl. No.: 16/303,452

(22) PCT Filed: May 19, 2017

(86) PCT No.: PCT/JP2017/018833
§ 371 (c)(1),
(2) Date: Nov. 20, 2018

(87) PCT Pub. No.: WO2017/204105
PCT Pub. Date: Nov. 30, 2017

(65) Prior Publication Data
US 2019/0263314 A1   Aug. 29, 2019

(30) Foreign Application Priority Data

May 23, 2016   (JP) .................................. 2016-102865

(51) Int. Cl.
*B60P 3/335*   (2006.01)
*B60P 3/32*   (2006.01)
(Continued)

(52) U.S. Cl.
CPC ................ *B60P 3/32* (2013.01); *B62D 53/06* (2013.01); *B62D 63/08* (2013.01); *E04B 1/003* (2013.01);
(Continued)

(58) Field of Classification Search
CPC ......... B60R 9/058; B29C 66/71; H02S 20/23; Y02B 10/12; Y02B 10/20; B60P 3/34;
(Continued)

(56) References Cited

U.S. PATENT DOCUMENTS 3,608,954 A * 9/1971 Lynd ........................ B60P 3/34
296/164
3,841,036 A * 10/1974 Johnson .............. E04B 1/34336
52/28
(Continued)

FOREIGN PATENT DOCUMENTS

| JP | 51-26407 Y2 | 7/1976 |
| JP | 2012-76732 A | 4/2012 |
| WO | 93/16898 A1 | 9/1993 |

OTHER PUBLICATIONS

Office Action dated Sep. 6, 2016, issued in counterpart Japanese Application No. 2016-102865, with English machine translation. (6 pages).

*Primary Examiner* — Kiran B Patel
(74) *Attorney, Agent, or Firm* — Westerman, Hattori, Daniels & Adrian, LLP

(57) ABSTRACT

[Problem] To provide a trailer house the roof of which can be effectively used as a rooftop deck, which trailer house has improved habitability, and which trailer house can satisfy a user's taste to a high level. [Solution] This trailer house is provided with: a dwelling structure provided with a wall body and a roof body positioned on the wall body and fixed to the wall body; and a support structure provided with wheels and a frame body integrated with the dwelling structure. The trailer house is towed to a destination by an automobile, and fixed at the destination to be used, and is characterized in that the roof body is provided with: a planar rooftop deck utilized part; a surrounding part that is positioned outward the peripheral edge of the rooftop deck
(Continued)

utilized part; and an entrance for entering or exiting the rooftop deck utilized part from/to the inside of the dwelling structure.

3 Claims, 4 Drawing Sheets

(51) Int. Cl.
| | | |
|---|---|---|
| *B62D 63/08* | (2006.01) | |
| *E04B 1/00* | (2006.01) | |
| *E04B 1/343* | (2006.01) | |
| *B62D 53/06* | (2006.01) | |
| *B62D 25/06* | (2006.01) | |
| *B62D 25/20* | (2006.01) | |
| *E04B 1/24* | (2006.01) | |

(52) U.S. Cl.
CPC .......... *E04B 1/343* (2013.01); *E04B 1/34336* (2013.01); *B62D 25/06* (2013.01); *B62D 25/20* (2013.01); *E04B 1/24* (2013.01)

(58) Field of Classification Search
CPC ............. E04D 13/0315; E04B 1/34336; E04B 1/3444; H01Q 19/19
See application file for complete search history.

(56) References Cited

U.S. PATENT DOCUMENTS

| | | | | |
|---|---|---|---|---|
| D362,417 S * | 9/1995 | Curtis | .......................... | D12/101 |
| 6,237,988 B1 * | 5/2001 | Messano | ................... | B60P 3/34 |
| | | | | 296/165 |
| 6,425,625 B1 * | 7/2002 | Messano | ................... | B60P 3/34 |
| | | | | 296/156 |
| 6,502,894 B1 * | 1/2003 | Ingram | ..................... | B60P 3/36 |
| | | | | 280/789 |
| 6,679,543 B2 * | 1/2004 | Messano | ................... | B60P 3/34 |
| | | | | 296/165 |
| 7,014,238 B2 * | 3/2006 | Gonzalez | ............ | A01M 31/025 |
| | | | | 135/88.01 |
| 7,234,759 B1 * | 6/2007 | Alohali | ..................... | B60P 3/34 |
| | | | | 296/168 |
| 7,832,155 B1 * | 11/2010 | Shea | ................... | E04B 1/34336 |
| | | | | 280/789 |
| 7,841,644 B1 * | 11/2010 | Ciarfello | ................. | B60R 3/005 |
| | | | | 296/162 |
| 8,272,829 B1 * | 9/2012 | Rupp | ...................... | B60P 1/027 |
| | | | | 414/482 |
| 8,757,640 B2 * | 6/2014 | Schaufelberger | .... | B62D 63/061 |
| | | | | 280/30 |
| 8,876,148 B2 * | 11/2014 | Sartini | ..................... | B60G 9/00 |
| | | | | 280/656 |
| 9,290,213 B2 * | 3/2016 | Connor | ................. | B62D 21/20 |
| 9,914,494 B1 * | 3/2018 | Meyer | ................. | B60R 11/0229 |
| 2002/0125736 A1 * | 9/2002 | Messano | ................. | B60J 7/165 |
| | | | | 296/165 |
| 2003/0094827 A1 * | 5/2003 | Faludy | ..................... | B60P 3/36 |
| | | | | 296/26.06 |
| 2005/0179277 A1 * | 8/2005 | Schneider | ................ | B60P 3/34 |
| | | | | 296/26.01 |
| 2005/0179278 A1 * | 8/2005 | Yoder | ...................... | B60P 3/34 |
| | | | | 296/26.13 |
| 2006/0278154 A1 * | 12/2006 | Towley, III | ............ | B63B 35/44 |
| | | | | 114/264 |
| 2007/0000425 A1 * | 1/2007 | Towley, III | ............ | B63B 35/44 |
| | | | | 114/344 |
| 2007/0007794 A1 * | 1/2007 | Bertoch | ................ | B62D 21/20 |
| | | | | 296/168 |
| 2008/0127579 A1 * | 6/2008 | Quinn | ................ | A62C 99/0081 |
| | | | | 52/79.5 |
| 2009/0223143 A1 * | 9/2009 | Esposito | ............. | E04B 1/34869 |
| | | | | 52/79.1 |
| 2013/0017023 A1 * | 1/2013 | Nicholls | ................... | B60P 3/14 |
| | | | | 406/39 |
| 2014/0004761 A1 * | 1/2014 | Neprud | ................ | B60F 3/0069 |
| | | | | 440/12.52 |
| 2015/0068692 A1 * | 3/2015 | Staudt | ...................... | B60J 11/04 |
| | | | | 160/368.1 |
| 2015/0361683 A1 * | 12/2015 | Scott, IV | ................. | E04H 9/14 |
| | | | | 52/79.1 |
| 2017/0370116 A1 * | 12/2017 | Cincotta | ............... | E04H 1/1205 |
| 2018/0361906 A1 * | 12/2018 | Devine | ..................... | H02S 10/40 |
| 2019/0226185 A1 * | 7/2019 | Cincotta | ............... | E03C 1/01 |

* cited by examiner

TRAILER HOUSE

TECHNICAL FIELD

The present invention relates to a trailer house which is towed to a destination by an automobile and located at the destination to be used. It further relates to a trailer house the rooftop part of which can be effectively utilized to improve habitability and satisfaction of the user's taste to a high level.

BACKGROUND OF THE INVENTION

There are a variety of trailer houses towed to destinations by automobiles and located there to be used. Various proposals have been made in view of spending comfortable time when located, especially as there are regulations by Japanese law on shapes and sizes for traveling.

For example, Document 1 discloses a trailer for a mobile house, which is easily moved by pulling with a traction vehicle, and in which wheels etc. that become useless in long term installation are easily detached, including a base frame which is a base pedestal of the house; a wheel unit including a wheel; and a slide mechanism which makes the wheel unit slide in a horizontal direction from the base frame which is jacked up, to be attached/detached. The base frame and the wheel unit are fixed together with a bolt, and a positioning mechanism is provided for positioning the base frame and the wheel unit at a position to be fixed by the bolt.

PRIOR ART

Patent Document

Document 1: Japanese Unexamined Patent Application Publication No. 2012-076732

SUMMARY OF THE INVENTION

Problems to be Solved

Recently, although various technologies in housing to effectively utilize rooftop decks for the purpose of improving the habitability and user's taste are proposed, any technology that utilizes a roof of a movable house such as a trailer house or a camper as a rooftop deck is not proposed.

Therefore the purpose of the present invention is to provide a trailer house which effectively utilizes the roof as a rooftop deck improving the habitability and satisfaction of the user's taste to a high level.

Solutions to Solve the Problems

To solve the problems, the inventor of the present invention studied and worked very hard with conviction that it was possible to attain the purpose by configuring the structures for utilizing the roof part of the trailer house as a rooftop deck and finally completed the present invention.

The present invention provides the followings:

1. A trailer house which is towed to a destination by an automobile and located at the destination to be used, the trailer house comprising:
    a dwelling structure having a wall body and a roof body located and fixed on top of the wall body;
    a support structure having a frame body integrally formed with the dwelling structure and a plurality of wheels, wherein said roof body includes a part for utilizing an accessible rooftop deck, a surrounding part such as a peripheral structure located on outside of the outer edge of the part for utilizing the rooftop deck, and an entrance for entering to the dwelling structure from the part for utilizing the utilizing rooftop deck and for exiting vise versa, providing access for a user between the dwelling structure and the rooftop deck,
    said dwelling structure includes a floor structure having a floor framework and a floor member for covering the surface of the floor framework to form the floor surface,
    said roof body includes a rooftop framework and a top board member for covering the surface of the rooftop framework to form the rooftop surface,
    wherein said rooftop framework is configured to have higher structural strength than the floor framework.
2. The trailer house according to 1, wherein
    said part for utilizing rooftop deck is provided in the rear part of the roof body and shares a half or more of the total area of the roof body, and
    said entrance is provided in the front part of the roof body and has an entrance roof located higher than the part for utilizing the rooftop deck, an entrance wall supporting the entrance roof, and a door facing backward of the roof body provided in the entrance wall.
3. The trailer house according to 1, wherein
    said floor framework includes a frame body in a predetermined shape and a plurality of floor in-frame-structural-members wherein each floor in-frame-structural-member is arranged parallel with a predetermined pitch inside the frame body,
    said rooftop framework includes a frame body in a predetermined shape and a plurality of rooftop in-frame-structural-members wherein each rooftop in-frame-structural-member is arranged parallel with a predetermined pitch inside the frame body, and
    the pitch arranged for the rooftop in-frame-structural-members is set narrower than
    the pitch arranged for the floor in-frame-structural-members,
    thereby the rooftop framework is configured to have higher structural strength than the floor framework.

The Effects of the Invention

The trailer house according to the present invention effectively utilizes the roof as a rooftop deck, improving the habitability and satisfaction of the user's taste to a high level.

| REFERENCE NUMBERS |
| --- |
| 1: trailer house |
| 2: living room |
| 3: bedroom |
| 4: bathroom |
| 10: dwelling structure |
| 11: wall body |
| 20: support structure |
| 30: roof body |

DETAILED DESCRIPTION OF THE EMBODIMENT

Figure 1:
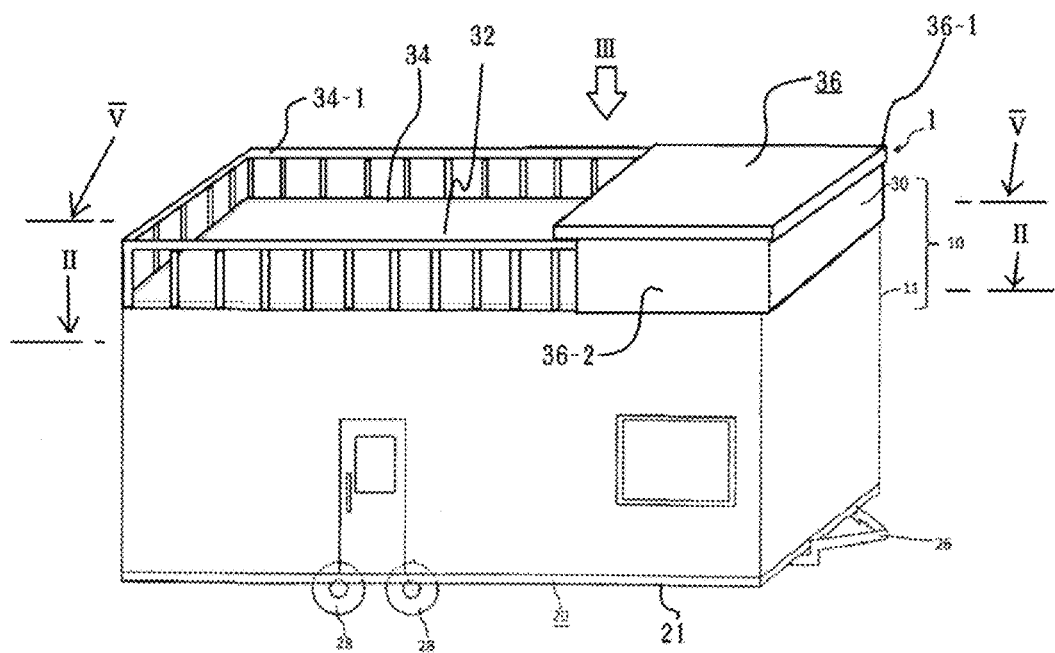
FIG. 1 is a perspective view of the trailer house according to an embodiment of the present invention.
Figure 2:
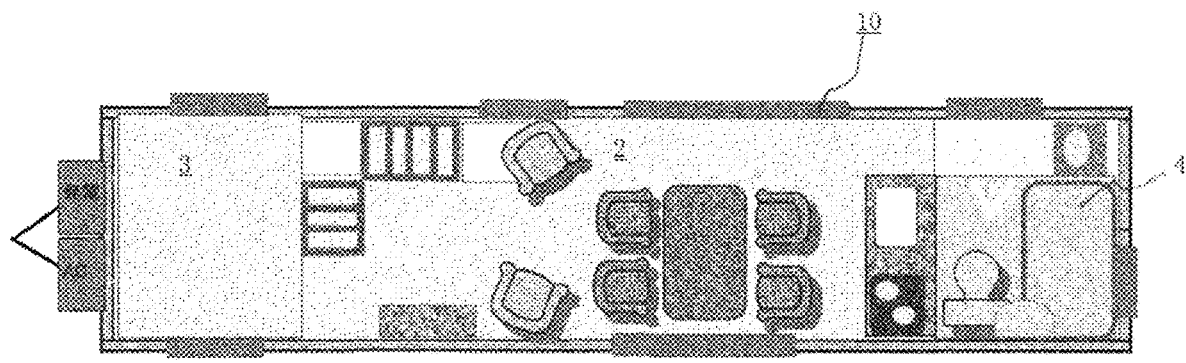
FIG. 2 is a cross-sectional view of the trailer house taken along the line II-II of FIG. 1.

The followings are the detailed descriptions of the present invention:

The trailer house 1 which is towed to a destination by an automobile (not shown in the figures) and located there to be used according to the present invention, as shown in FIG. 1 and FIG. 2, includes a dwelling structure 10 with a wall body 11 and a roof body 30 fixed on top of the wall body 11, and a support structure 20 with a frame body 21, which is integrally formed with the dwelling structure 10, and a plurality of wheels 28.

In accordance with the support structure 20, not shown in the figures, the frame body 21 is rectangular and a plurality of linear reinforce members to reinforce the frame body 21 are provided on the support structure 20 at predetermined intervals so as to connect the two opposite long sides of the frame body 21 and parallel to the short sides of the frame body. The frame body 21 is arranged to locate from the center to the upper end of the wheels 28 in the height direction, and the floor of the zone except the living room 2, where the wheel fixing members in the dwelling structure are equipped, extends downward allowing enlarged living space.

The frame body 21 in the support structure 20 is assembled to connect frame members such as steel frames namely C-type steel or H-type steel (in the present embodiment, C-type steel) by welding or bolting, respectively in the longitudinal direction (in the travelling direction of the automobile) and in the width direction. Also, the reinforce members are provided by connecting the same members as the frame body 21 to the frame body 21. According to the embodiment of the present invention, as the support structure 20 is located in a low position, by uplifting the connecting member connected to the bottom of the frame body 21 vertically in front of the dwelling structure, the connecting position to the automobile is optimally adjusted (not shown).

Also in front of the support member 20, connecting member 26 to be connected to the automobile is equipped.

The total length, width and height of the trailer house can be selected within a range by Japanese law, but this embodiment is formed about 9 m in full length, 2.5 m in width and 3.8 m in height from the ground to the top of the roof.

Dwelling structure 10 according to the embodiment of the present invention is formed by so-called two-by-four construction method, preferably two-by-four construction method as later described, but not limited by this method and other methods can be adopted such as framework construction method or the like.

Also, other members for climbing up from the ground to the height of the chassis, or a retractable slope while travelling (not shown) can be provided on the trailer house.

In the trailer house 1 according to the embodiment of the present invention, the dwelling structure 10 is rectangular as shown in FIG. 2 and is divided into 3 zones of the living room 2, the loft 3 including the bedroom located below the loft 3 (not shown) and the bathroom 4 in the longitudinal direction. Also, in the bathroom 4 zone, not only a bathtub and a toilet but free space where a washing machine can be placed are allocated. According to the embodiment of the present invention, the floors of the front bedroom and the rear bathroom zones are set low compared to those of a conventional trailer house. For that reason there is a gap between the bedroom and the living room 2 and the bedroom floor is low. Also, the bathroom 4 floor is in the same height of the living room 2 floor without being higher than the living room 2 as in a conventional trailer house.

Although the bathroom is ordinarily higher than the floors of other spaces causing gaps due to the equipment such as a pipe unit set in about 10 cm below the bathroom floor, the bathroom 4 according to the embodiment of the present invention is in the same height of the living room 2 floor, that enables a higher internal space than the ordinary bathroom or toilet space and enables to provide a loft above the bathroom.

Thus, by unconventionally lowering the floor, it is capable to obtain higher internal space, thanks to the support structure as is described later. For the trailer house traveling on the road, the height and the width are restricted by Japanese law. However, as the support structure of the trailer house according to the embodiment of the present invention has the structure capable of setting the height of the support structure lower, it is also capable of setting the floor height lower.

Figure 3:
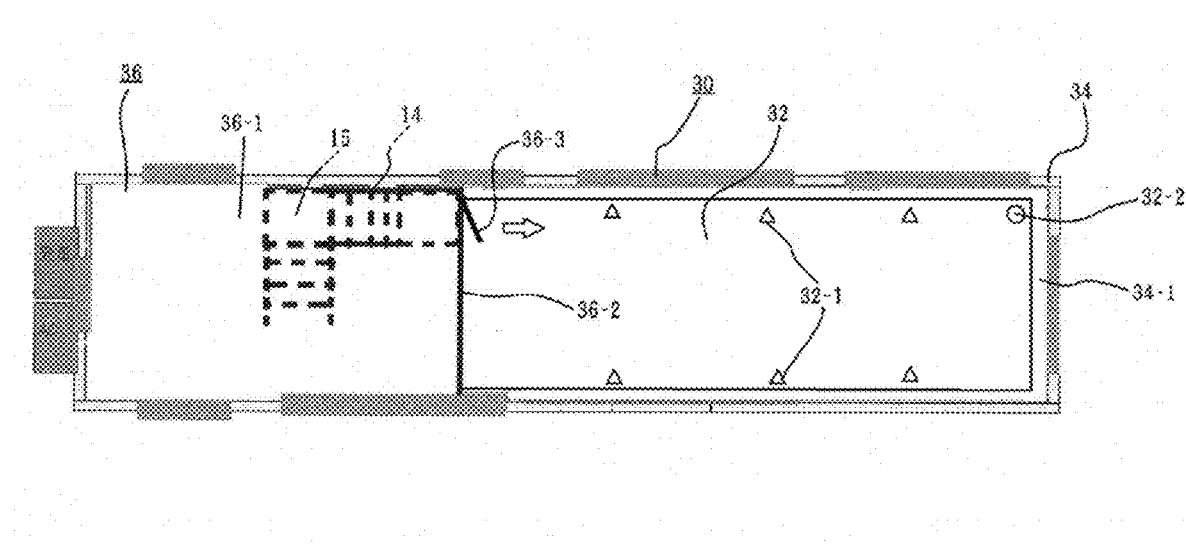
FIG. 3 is the III arrow view of the trailer house as shown in FIG. 1.
Figure 4:
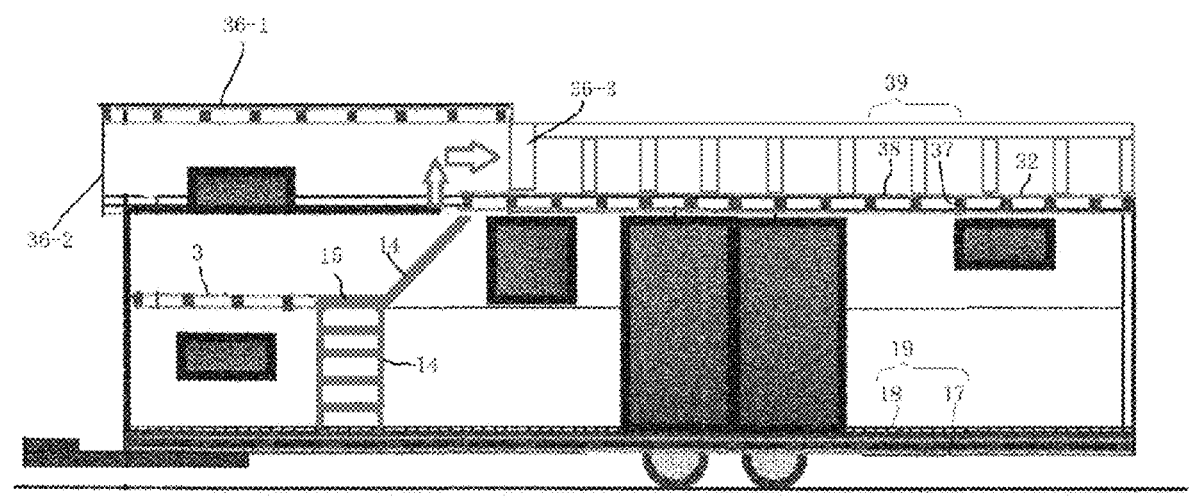
FIG. 4 is a partial perspective side view of the trailer house as shown in FIG. 1.
Figure 5:
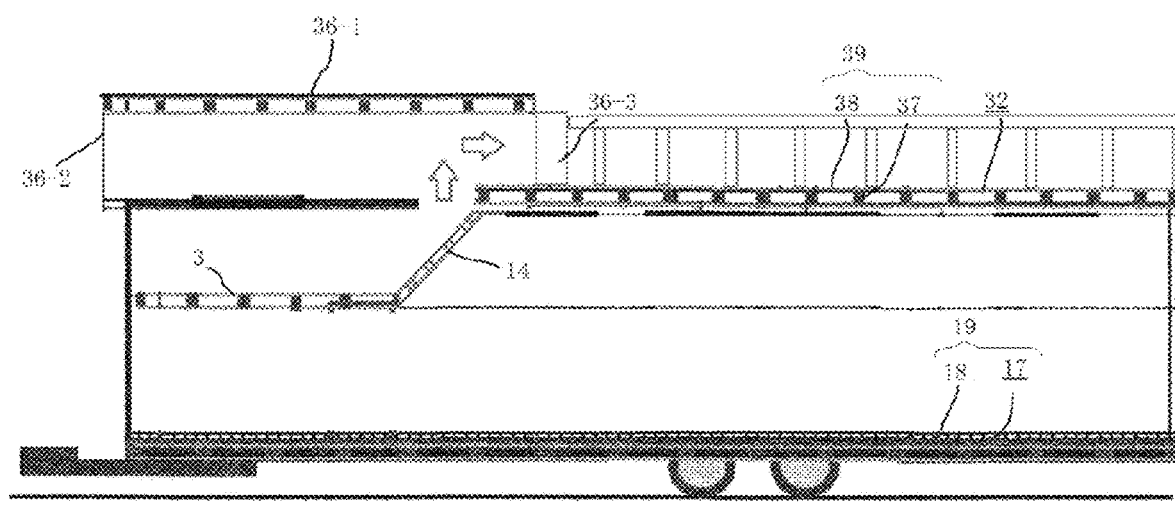
FIG. 5 is a cross-sectional view of the trailer house taken along the line V-V of FIG. 1.

Next, the trailer house according to the embodiment of the present invention, referring to FIGS. 3 to 5, a roof body 30 includes a part for utilizing a rooftop deck 32, a surrounding part (a peripheral structure) 34 located on outside of the outer edge of the part for utilizing the rooftop deck 32 and an entrance 36 for entering and exiting from the dwelling structure 10 to the part for utilizing the rooftop deck 32.

The part for utilizing the rooftop deck 32, referring to FIG. 3, is provided in the rear part of the trailer house, that is, in the rear part of the roof body 30. In this specification, the front is the direction that a connecting member 26 in FIG. 1 is equipped and forward when the vehicle is travelling, and the rear is the opposite. Also, the part for utilizing the rooftop deck 32 shares a half or more of the total area of the roof body 30 and according to the embodiment of the present invention about ⅔. Thus by providing the part for utilizing the rooftop deck 32 in the rear, it is possible to prevent the entrance to/from the rooftop deck from being damaged, by minimizing the air resistance while travelling. Besides by providing a half or more area of the roof body 30 for the part for utilizing the rooftop deck 32, enough part for utilizing the rooftop deck can be secured as well as increasing strength of the later-described part for utilizing the rooftop deck and dwelling structure, and trailer house can be used at ease while travelling and using the rooftop part. It is preferable to provide the part for utilizing the rooftop deck 32 ¾ or less area of the roof body 30 for the convenience of securing enough space of the entrance 36 for ascending and descending.

The entrance 36, as shown in FIG. 3 and FIG. 4, is provided in the front part of the roof body 30 and has an entrance roof 36-1 located higher than the part for utilizing the rooftop deck 32, an entrance wall 36-2 supporting the entrance roof 36-1, and a door 36-3 provided in the entrance wall 36-2 facing backward of the roof body 30. Between the floor of the living room 2 and the door 36-3 of the part for utilizing the rooftop deck 32, a plurality of stairs 14 are provided for ascending and descending (see FIGS. 2, 3 and 4). Also, the stairs 14 have a landing 15 connecting to the floor of the loft 3 configuring the loft 3. By connecting the loft floor and the landing, the strength of the stairs 14 is improved and makes the movement to the door 36-3 safer and easier. Thus, configuring this way, the user can extend the use of the stairs for ascending/descending, from the loft 3 to the rooftop deck. Although according to the embodiment of the present invention the landing 15 is configured to extend out of the floor of the loft 3, not limited by this embodiment, it is possible to use a part of the floor of the loft 3 as a landing. The height of the entrance roof 36-1 is not specifically limited as long as the user can enter/exit and within the total height permitted by Japanese law. The height of the entrance roof according to the embodiment of the present invention is about 1 m.

Referring to FIGS. 4 to 7, dwelling structure 10 includes a floor structure 19 having a floor framework 17 and a floor member 18 for covering the surface of the floor framework 17 to form the floor surface. Also, the roof body 30 includes a rooftop framework 37 and a top board member 38 for covering the surface of the rooftop framework 37 to form the rooftop surface so that said rooftop framework is configured to have higher structural strength than the floor framework.

Figure 6:
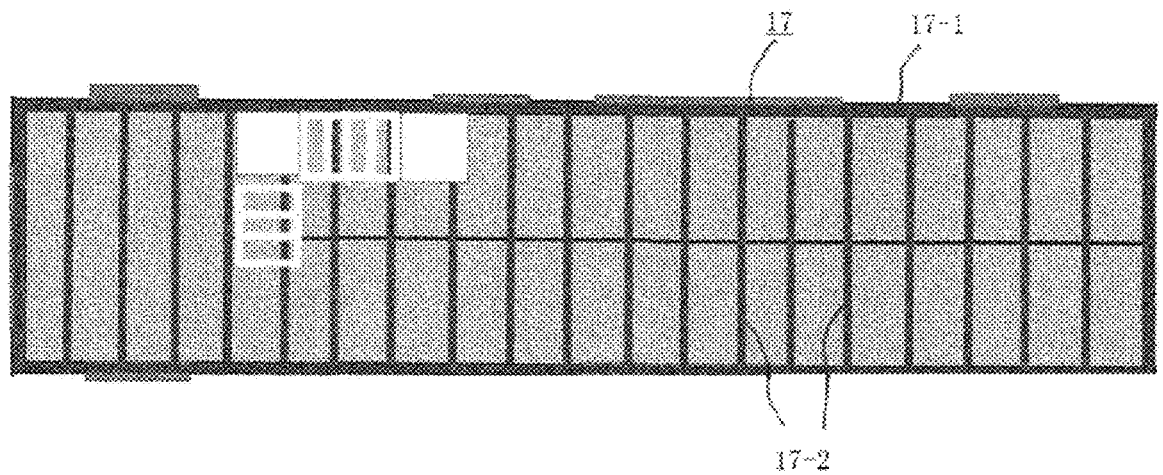
FIG. 6 is an inside perspective plan view of the structure of the trailer house's floor as shown in FIG. 1.
Figure 7:
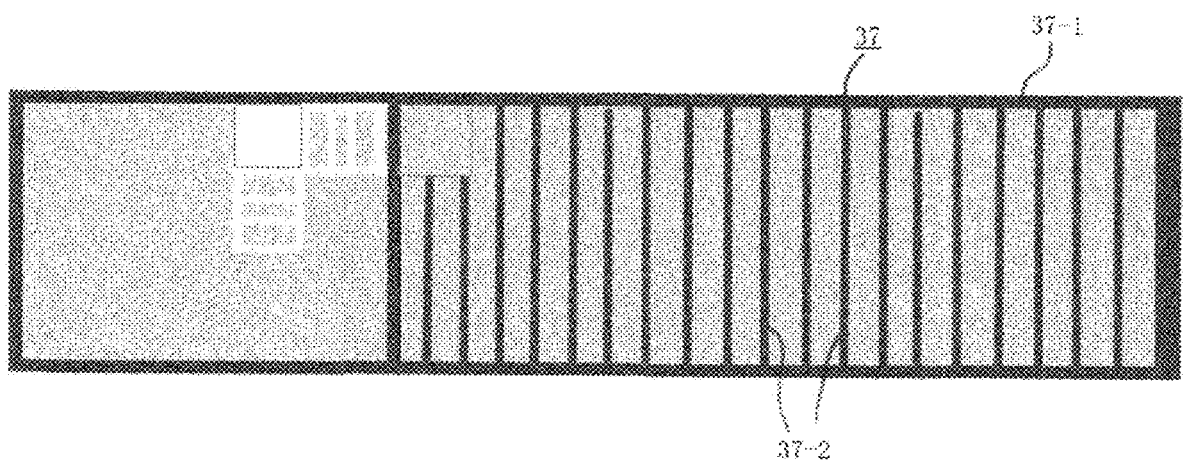
FIG. 7 is an inside perspective plan view of the structure of the trailer house's rooftop deck as shown in FIG. 1.

Specifically, referring to FIGS. 6 and 7, the floor framework 17 includes a frame body 17-1 in a predetermined shape and a plurality of floor in-frame-structural-members 17-2. Each floor in-frame-structural-member is arranged parallel with a predetermined pitch inside the frame body 17-1. And the rooftop framework 37 includes a frame body 37-1 in a predetermined shape, and a plurality of rooftop in-frame-structural-members 37-2. Each rooftop in-frame-structural-member is arranged parallel with a predetermined pitch inside the frame body 37-1. Here the pitch arranged for the rooftop in-frame-structural-members is configured to be set narrower than the pitch arranged for the floor in-frame-structural-members so that the rooftop framework 37 is configured to have higher structural strength than the floor framework 17. According to the embodiment of the present invention, the arranged pitch for the floor in-frame-structural-members 17-2 is 45 cm while the arranged pitch for the rooftop in-frame-structural-members 37-2 is 30 cm, but not limited by these pitches as long as the latter is narrower than the former, preferably within the range of 9/10 to 1/2 ratios. If the pitch of the rooftop in-frame-structural-members is less than ½ of the pitch of the floor in-frame-structural-members, the rooftop part is too heavy and the structural strength as a whole trailer house becomes lower.

Since the rooftop framework has higher structural strength than the floor framework, in case of forming the entrance to/from the rooftop part inside the dwelling structure, securing enough strength not only for utilizing the rooftop part but also for the whole trailer house from the viewpoint of mobility is discovered very important. Thus it is fundamental for the trailer house the rooftop part of which is utilized to have the floor framework and the rooftop framework being configured this embodiment.

It should be noted that the framework for the entrance roof is configured in the same way as the rooftop framework.

The surrounding part 34 of the part for utilizing the rooftop deck 32 on the trailer house according to the embodiment of the present invention, a fence 34-1 for fall prevention (see FIGS. 1 and 3), and an emergency ladder (not shown) for climbing down from the part for utilizing the rooftop deck 32 are equipped. Also, on the part for utilizing the rooftop deck 32, a plurality of safety hooks 32-1 are equipped to prevent a tent and poles, etc. from falling down, and a plurality of drain holes 32-2 are provided to prevent rainwater, etc. from staying on the rooftop part and to let it drain outside through the drainpipes (not shown) provided inside the dwelling structure.

By configuring as this embodiment, the user can go up to and come down from the rooftop deck without being effected by rain or snow.

Also, the maximum floor area of the trailer house which can travel on the road is less than 40 m² under the Japanese Road Traffic Law, and the size not excessing the limit of general automobile laws in Japan is the maximum width less than 2.5 m and the total length less than 12 m. Therefore, to obtain enough area for spending comfortable time on the rooftop deck and for entering from and exiting to the rooftop deck without being effected by rain or snow, the area of the part for utilizing the rooftop deck is preferably less than 30 m², that is, ½ to ¾ of the total floor area of the part for utilizing the rooftop deck.

The trailer house according to the embodiment of the present invention can be used as a dwelling structure by placing the frame body 21 on any kind of foundation and connecting water and electricity supplies after being connected with the connecting member 26 to an automobile (not shown) and being towed to the destination.

In case of providing an entrance in the living room 2, the user can go inside through the entrance, live using the bedroom 3 and the bathroom as needed, afford a bedroom with higher ceiling, a spacious bathroom with a bathtub and a toilet, and a loft above the bathroom. Although there are height and width regulations by Japanese law, the user can use large space and live in the comfortable dwelling space.

Also, as above described rooftop deck is provided, securing amusement space on the rooftop deck and enjoying what the user could not experience with the ordinary campers or trailer houses such as barbeque on the rooftop, camping out with a tent, open-air bath or maybe more natural experiences are available. Moreover, by gathering a plurality of trailer houses, interactions of people over the rooftop decks also becomes feasible.

As above described, the embodiment of the present trailer house is capable of allocating the larger living space in the height direction, providing spacious living quarters and utilizing the space to the maximum by providing a loft. Also, barrier-free bathroom can be implemented. All of these enable the usages as a hobby in retirement, a temporary housing in times of emergency, a welfare vehicle used for mobile bathing service and the like, and such usages excel above the ordinary art in any of the categories.

It is to be expressly understood that the present invention is not intended as a definition of the limits according to the above described embodiment and various changes within the scope of the claims should be allowed without departing from the spirit of the invention.

For example, the detailed numerical values of each measurement and size of the trailer house according to the embodiment of the present invention are only examples and the invention shall not be limited by such numerical values.

What is claimed is:

1. A trailer house configured to be towed by an automobile to a destination and placed at the destination at which the trailer house is to be used, the trailer house comprising:
   a dwelling structure which comprises
      a wall body,
      a roof body located and fixed on a top of the wall body and comprising an accessible rooftop deck, a peripheral structure formed along an outer edge of the rooftop deck to surround the outer edge, and an entrance for user's access between the dwelling structure and the rooftop deck, said roof body further comprising a rooftop framework and a top board member which covers a surface of the rooftop framework so as to form a rooftop surface, and a floor structure having a floor framework and a floor member which covers a surface of the floor framework so as to form a floor surface; and a support structure having a frame body integrally formed with the dwelling structure and provided with a plurality of wheels such that trailer house is movable, wherein said rooftop framework is configured to have higher structural strength than the floor framework.

2. The trailer house according to claim 1, wherein said rooftop deck is provided in a rear part of the roof body and shares a half or more of the total area of the roof body, and said entrance is provided in a front part of the roof body and has an entrance roof located higher than the rooftop deck, an entrance wall supporting the entrance roof, and a door facing backward of the roof body provided in the entrance wall.

3. The trailer house according to claim 1, wherein said floor framework comprises a frame body formed in a predetermined shape and a plurality of floor in-frame-structural-members, each of said floor in-frame-structural-members being arranged parallel to one another with a predetermined pitch inside the frame body, said rooftop framework comprises a frame body formed in a predetermined shape and a plurality of rooftop in-frame-structural-members, each of said rooftop in-frame-structural-members being arranged parallel to one another with a predetermined pitch inside the frame body, and the pitch between the adjacent rooftop in-frame-structural-members is set to be narrower than the pitch between the adjacent floor in-frame-structural-members such that the rooftop framework has the higher structural strength than the floor framework.

* * * * *